United States Patent Office 2,865,001
Patented Dec. 16, 1958

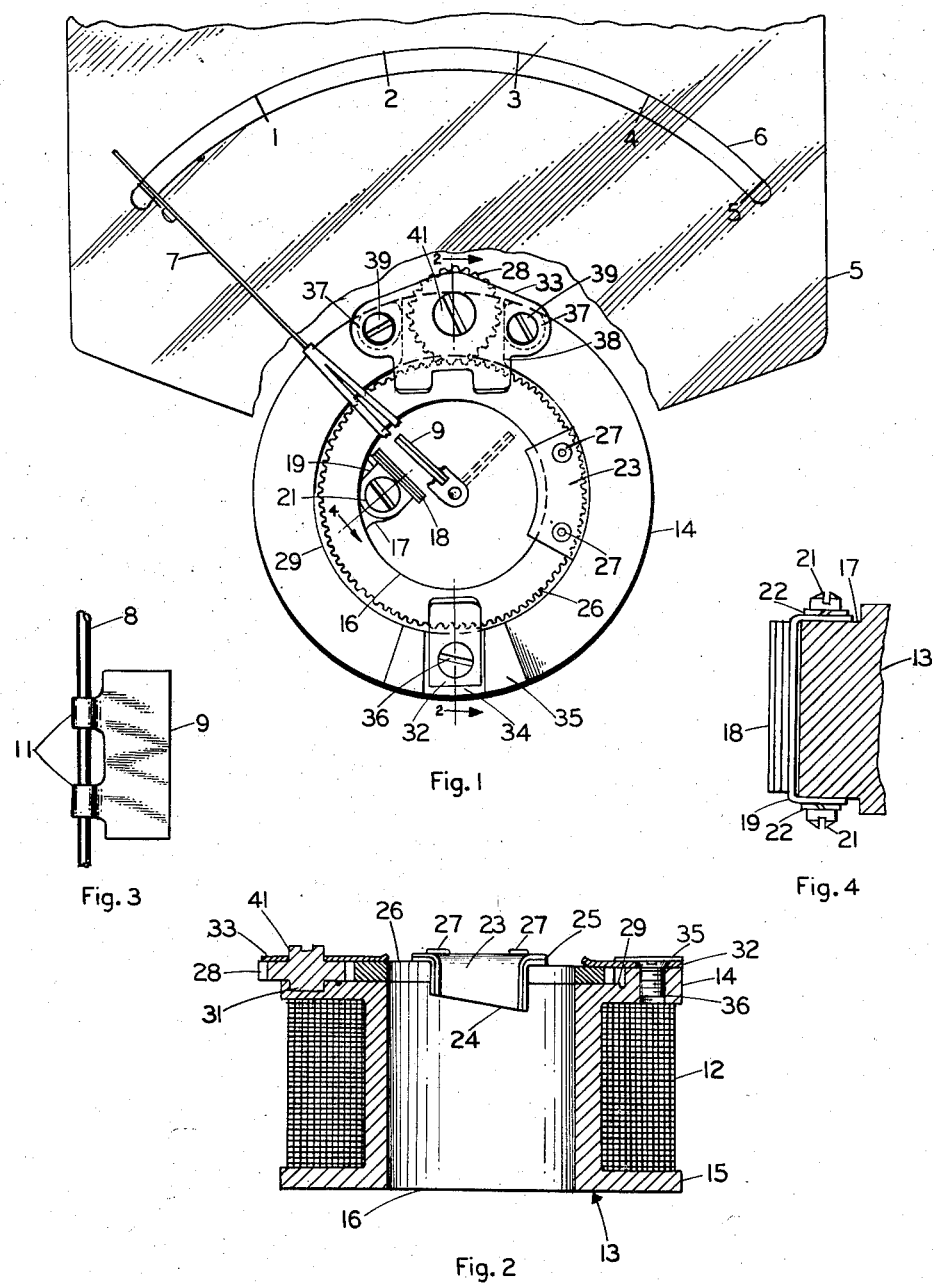

2,865,001

ELECTRICAL MEASURING INSTRUMENT

Norval P. Millar, Danvers, Mass., assignor to General Electric Company, a corporation of New York Application December 28, 1955, Serial No. 555,957

7 Claims. (Cl. 324—147)

This invention relates generally to electrical measuring instruments and more particularly to improvements in electrical measuring instruments of the repulsion type wherein novel means are provided to adjust the full-scale deflection thereof.

In the manufacture of electrical measuring instruments of the repulsion type, it is usually necessary to devise some means for adjusting the instrument after assembly to insure that the instrument pointer coincides with the desired predetermined full-scale indicia when the rated full-scale magnitude of the electrical quantity is being measured. Such means should be as simple as possible to permit ready adjustment in the factory without unduly adding to the cost or complexity of the instrument. In addition, such means should be readily accessible for adjustment in the field when necessary, and any such adjustment, whether in the factory or in the field, should not significantly affect other performance characteristics of the instrument.

Heretofore an adjustable control spring coupled to the instrument pointer has been used to adjust the full-scale deflection characteristic but such adjustment has proved to be very tedious and time consuming, adding materially to the manufacturing cost of the instrument.

It is thus a primary object of the invention to provide improved means for adjusting the full scale deflection characteristic of an electrical measuring instrument of the repulsion type wherein the adjustment may be done rapidly and inexpensively.

It is another object of the invention to provide simple, accessible, and low cost means for adjusting the full-scale deflection characteristic in the type of instrument under consideration.

It is yet another object of the invention to provide improved means for adjusting the full-scale deflection characteristic in the type of instrument under consideration wherein the adjustment of such means does not significantly affect other important operating characteristics of the instrument.

Briefly, in one aspect thereof, the invention contemplates the use of an adjustably mounted control vane to modify the full-scale deflection characteristic of an instrument pointer normally deflected by the forces of repulsion acting between a pair of relatively movable magnetic vanes. One of these vanes is fixed and the other is pivotally mounted with respect thereto and the control vane is normally positioned proximate to the predetermined full-scale position of the pivotally mounted vane.

All of the vanes are arranged to be magnetized by a magnetic field which varies in accordance with the magnitude of an electrical quantity being measured, the pivotally mounted vane being repelled by the fixed vane and attracted by the control vane.

The control vane is contoured in a novel manner to enhance its control effect, and it is mounted on a rotatably mounted gear arranged to mesh with a readily manipulatable pinion.

The arrangement is such that the full-scale deflection characteristic of the instrument may be varied as much as ±25% without increasing the permissible rated error of the instrument beyond ¼ of 1%.

The invention, as well as its objects and advantages, will be more fully understood upon reference to the detailed description set forth below, particularly when taken in conjunction with the drawing annexed hereto, in which:

Figure 1 is a top view of portions of an electrical measuring instrument of the repulsion type, illustrating the invention;

Figure 2 is a sectional view, in elevation, taken along the lines 2—2 in Figure 1;

Figure 3 is a view of the moving vane, including a portion of the pointer shaft, and;

Figure 4 is a partial sectional view of the fixed vane, including its mounting arrangements, taken along line 4 of Figure 1.

Referring now to Figure 1, there is seen a portion of an instrument dial 5, which, in the illustrated embodiment, is intended to indicate the magnitude of an A. C. current being measured, the instrument having a full-scale deflection corresponding to 5 amperes. The dial 5 has a suitably marked scale 6, graduated in amperes from 0 to 5, and cooperating with a pivotally mounted instrument pointer 7.

Pointer 7 is carried by a rotatably mounted shaft 8, a portion of which is shown in Figure 3, this shaft also carrying the flat elongated magnetic vane 9 which is securely affixed thereto. As seen in Figure 1, vane 9 is a laminated member and it may be formed as an integral piece, it being initially punched out of a flat sheet to form a pair of interconnected vanes after which it is folded over to form the laminated vane 9, the interconnecting portions being shaped to form the spaced hubs 11 which may be soldered onto shaft 8.

Shaft 8 may be journalled for rotation in any known manner, it being understood that conventional instrument bearings may be used, the details of which are understood by those skilled in the art and omitted herein in the interests of brevity and clarity. Also not shown in the drawing is a conventional control spring, formerly used to adjust full-scale deflection, but presently used merely to bias the instrument pointer in its zero position and provide a counter-torque against which the repulsion forces drive the vane 9.

Surrounding the shaft 8, and its associated vane 9, is an electrical winding 12 carried by a support member in the form of a molded spool 13 having top and bottom end flanges 14, 15 respectively, and a centrally disposed opening 16. The winding 12 is adapted to be connected to the electrical circuit being measured and when energized, it establishes a magnetic field within the opening 16 in a direction along its longitudinal axis, this field varying in accordance with the magnitude of the current being measured.

The spool may be formed of any suitable electrical insulating material and also includes an integral boss 17 projecting into the opening 16 and extending along the opening for a portion of its length. The boss 17 is provided as a support for an elongated flat fixed vane 18. This vane is approximately equal in length to the moving vane 9, is positioned symmetrically with respect to vane 9, and is in the form of a laminated magnetic member rigidly secured to a mounting bracket 19 which fits over the ends of boss 17 and is rigidly attached thereto by the screws 21 and associated lockwashers 22.

In the arrangement described so far, when the winding 12 is energized, the vanes 18 and 9 will be magnetized by the magnetic field established by the winding, and since both vanes are magnetized in the same direction, a force of repulsion will be established between them. This force will cause deflection of the moving vane 9, against the biasing action of the zero setting control spring, and the vane 9 will move to assume an angular position corresponding to the magnitude of the current being measured.

In the position of the vanes shown in solid lines in Figure 1, the instrument reads zero, it being noted that in this position the vanes are substantially parallel to each other and also spaced apart. When the maximum rated current is energizing the winding 12, vane 9 should assume the position shown in dotted lines in Figure 1, at which position the vanes are at right angles to each other and the instrument pointer has been deflected to its predetermined full-scale position.

In the mass production of electrical measuring instruments of the class described, it has been found that low cost manufacturing techniques do not always produce a perfect instrument, in that permissible variations in the manufacturing tolerances for the various cooperating parts of the instrument may result in an instrument which reads either too low or too high when the winding is energized for full-scale deflection of the pointer. It has been found that the pointer deflection may vary as much as ±15% at the full-scale position, such variation being far too much for an instrument intended to have a rated accuracy of ¼ of 1%.

In order to control the full-scale deflection characteristic of the instrument, without significantly affecting other important operating characteristics, a novel arcuate magnetic vane 23 is adjustably mounted at one end of the winding 12, normally positioned proximate to the predetermined full-scale position of the vane 9.

Vane 23 is in the form of a laminated member having its inner edge 24 inclined at an angle with respect to the axis of opening 16 and its outer edge turned at right angles to the main body of the vane to form the mounting flange 25. Also, the vane 23 is offset from the vanes 9 and 18 in the direction of the axis of the opening 16, being magnetized in the same direction as vanes 9 and 18 upon energization of winding 12 but of relatively opposite polarity with respect to the other vanes because of its offset location. That is, assuming all of the vanes to be instantaneously magnetized in such a way that their upper edges are north and their lower edges are south, it is apparent that the north pole of vane 9 will be contiguous to the south pole of vane 23.

Thus, a force of attraction will be established between vanes 9 and 23, which force will have a like effect on vane 9 as the force of repulsion between it and vane 18, and the two forces together will thus determine the precise angular position of the moving vane. By moving the vane 23 toward or away from the vane 9, it is apparent that the force of attraction may be varied at will to control the position of vane 9. Since vane 23 is proximate to the full-scale position of vane 9, it is apparent that it may be adjusted to move the vane 9 to its predetermined full-scale position when the winding 12 is energized with a current of 5 amperes.

The angle of inclination of edge 24, the maximum depth of this edge, and the extent of arcuate length can all be varied slightly to perfect the control effect of the vane in which event optimum shaping produces optimum instrument performance. In the illustrated embodiment, the vane 23 subtends an arc of approximately 60°, has its edge 24 inclined at an angle of 76° with respect to the longitudinal axis of opening 16, and its depth is such that there is always clearance between the edge 24 and the upper edge of vane 9 for any position of vane 23. There may be some overlapipng between the upper edge of vane 9 and the extreme lower tip of edge 24, but the vane 23 is never in any position where this overlapping could create interference to movement of vane 9.

To adjust the position of vane 23, a novel adjusting mechanism is provided including the rotatably mounted gear 26, to which the vane is rigidly attached, by means of rivets 27 or the like, and the rotatably mounted pinion 28 which engages the teeth of gear 26.

The upper flange 14 of spool 13 has an annular recess 29 to provide a seat for gear 26 and it also has a small opening to receive the stub shaft 31 formed as a part of pinion 28. To retain the gear and pinion assembly in place in the end of the spool, a pair of resilient clips 32, 33 are provided, these clips overlying the parts to be retained.

In the case of clip 32, it is mounted in a channel 34 provided in a boss 35 formed on flange 14, being secured in the channel by a suitable screw 36.

In the case of clip 33, it is mounted on a pair of spaced bosses 37 formed on flange 14 and underlying the clip, these bosses being separated by a channel 38 formed as an extension of recess 29, the clip being secured to the bosses by suitable screws 39.

The channel 38 forms a seat for pinion 28 and the clip 33 has an aperture therein through which projects the slotted head 41 formed on the pinion. This slotted head may be easily manipulated by a screw driver or the like to turn the pinion 28, which in turn causes the gear 26 to rotate and thus position the control vane 23 as desired. The resilient clips are not stiff enough to prevent ready adjustment of the control vane, yet they are stiff enough to retain the gear and pinion in place on the spool flange.

The edges of the clips may act as stops limiting motion of vane 23 in either direction, or separate stops could be added to accomplish this function. Moreover, the gear 26 need not have teeth completely around its periphery, although it may be more convenient to manufacture the gear as it is shown. In addition, the precision of adjustment may be controlled by proper control of the gear ratio between the gear 26 and pinion 28. Ordinarily, it would be desirable to select a ratio that would yield a vernier-like control. As heretofore stated, adjustment of vane 23 may modify the full scale deflection of the instrument by as much as ±25%, which is more than enough to compensate for the ±15% variation expected during manufacture.

From the above, it is seen that the vane 23 provides more than enough control of the full scale deflection characteristic of the instrument without significantly affecting other important operating characteristics of the device. This vane is easy to manufacture, easy to install, and quite easy to adjust. Accessibility and simplicity keynote the design of the gear and pinion adjusting arrangement, and, altogether, this adjusting arrangement in combination with the vane 23 provides far superior instrument performance.

Finally, although the invention has been shown in connection with a current measuring instrument, it has equal application to instruments for measuring voltage, or for that matter, any other electrical quantity that can be conveniently measured by a repulsion type measuring instrument.

Therefore, while a particular embodiment of the subject invention has been shown and described herein, it is in the nature of description rather than limitation, and it will occur to those skilled in the art that various changes, modifications, and combinations may be made within the province of the appended claims, and without departing either in spirit or scope from this invention in its broader aspects.

What I claim as new and desire to secure by Letters Patent of the United States is:

1. In an electrical measuring instrument of the repulsion type, a winding having an opening therein and being effective when energized for producing a magnetic field in said opening which varies in accordance with the magnitude of an electrical quantity to be measured, a first magnetic vane fixedly mounted and extending in a radial direction within said opening, a second flat magnetic vane pivotally mounted within said opening, said first and second vanes being substantially parallel when said winding is deenergized and being effective when magnetized to develop repulsion forces therebetween whereby said second vane moves to assume an angular position which varies in accordance with the magnitude of said electrical quantity, said second vane having a predetermined angular position corresponding to a maximum magnitude of said electrical quantity, a third magnetic vane adjustably mounted within said opening and normally positioned proximate to said predetermined position of said second vane, said third vane being of arcuate shape and offset from said first and second vanes in the direction of the axis of said opening and having its inner edge inclined at an angle with respect to said axis, said third vane being normally positioned proximate to said predetermined position of said second vane such that one end of said third vane is proximate to said predetermined position with the remainder of said third vane extending in a direction away from the region transversed by said second vane in moving from the unenergized position to the said predetermined position, said second and third vanes being effective when magnetized to develop attraction forces therebetween, said attraction forces having a like effect on said second vane as said repulsion forces whereby the two forces together determine the precise angular position of said second vane, means for adjusting the position of said third vane to cause said second vane to assume said predetermined angular position when said winding is energized by said maximum magnitude of said electrical quantity, said last named means comprising a rotatably mounted ring member surrounding said opening and located at one end thereof, said ring member having a plurality of gear teeth formed on at least a portion of its periphery, said third vane being fixedly mounted on said ring member, and a rotatably mounted pinion engaging said gear teeth, said pinion being formed for ready manipulation thereof whereby a substantially linear scale is obtained for each position of said third vane over its operating range.

2. In an electrical measuring instrument of the repulsion type, a winding having an arcuate opening therein and being effective when energized for producing a magnetic field within said opening extending in a first direction substantially parallel to the longitudinal axis of said opening, said field varying in accordance with the magnitude of an electrical quantity being measured, a first elongated flat magnetic vane fixedly mounted within said opening and extending in said first direction, a second elongated flat magnetic vane pivotally mounted within said opening and extending in a radial plane in said first direction, said first and second vanes being substantially parallel when said winding is de-energized and being effective when magnetized to develop repulsion forces therebetween whereby said second vane moves to assume an angular position which varies in accordance with the magnitude of said electrical quantity, said second vane having a predetermined angular position corresponding to a maximum magnitude of said electrical quantity, said vanes being substantially perpendicular to each other when said second vane is in said predetermined position, a third arcuate magnetic vane adjustably mounted within said opening extending in said first direction and being normally positioned with one end located proximate to said predetermined position of said second vane and the remainder of said third vane extending in a direction remote from the region transversed by said second vane upon energization of the said winding, said third vane being offset from said first and second vanes in said first direction and having its inner edge inclined at an angle with respect to said first direction, said second and third vanes being effective when magnetized to develop attraction forces therebetween, said attraction forces having a like effect on said second vane as said repulsion forces whereby the two forces together determine the precise angular position of said second vane, means for adjusting the position of said third vane to cause said second vane to assume said predetermined angular position when said winding is energized by said maximum magnitude of said electrical quantity, said last named means comprising a rotatably mounted ring member surrounding said opening and located at one end thereof, said ring member having a plurality of gear teeth formed on at least a portion of its periphery, said third vane being fixedly mounted on said ring member, and a rotatably mounted pinion engaging said gear teeth, said pinion having a slotted head for ready manipulation thereof whereby a substantially linear scale is obtained for each position of said third vane over its operating range.

3. In an electrical measuring instrument of the repulsion type, a supporting member in the form of a spool having a centrally disposed opening therein, a winding mounted on said spool and being effective when energized for producing a magnetic field within said opening extending in a first direction substantially parallel to the longitudinal axis of said opening, said field varying in accordance with the magnitude of an electrical quantity being measured, a first flat magnetic vane fixedly mounted on said spool within said opening and extending in said first direction, a second flat magnetic vane pivotally mounted within said opening and extending in said first direction, said second vane also extending radially from said longitudinal axis, said first and second vanes being substantially parallel when said winding is de-energized and being effective when magnetized to develop repulsion forces therebetween whereby said second vane moves to assume an angular position which varies in accordance with the magnitude of said electrical quantity, said second vane having a predetermined angular position corresponding to a maximum magnitude of said electrical quantity, said vanes being substantially perpendicular to each other when said second vane is in said predetermined position, a third arcuate magnetic vane adjustably mounted within said opening extending in said first direction and being normally positioned with one end located proximate to said predetermined position of said second vane and the remainder of said third vane extending in a direction remote from the region transversed by said second vane upon energization of said winding, said third vane being offset from said first and second vanes in said first direction and having its inner edge inclined at an angle with respect to said first direction, said second and third vanes being effective when magnetized to develop attraction forces therebetween, said attraction forces having a like effect on said second vane as said repulsion forces whereby the two forces together determine the precise angular position of said second vane, means for adjusting the position of said third vane to cause said second vane to assume said predetermined angular position when said winding is energized by said maximum magnitude of said electrical quantity, said last named means comprising a gear rotatably mounted on one end of said spool, said gear having a centrally disposed opening in alignment with said spool opening, said third vane being mounted on said gear, and a rotatably mounted pinion located on said end of said spool and engaging said gear, said pinion being formed for ready manipulation thereof whereby a substantially linear scale is obtained for each position of said third vane over its operating range.

4. The combination defined by claim 3 wherein said third vane has a flange integral therewith extending at right angles therefrom to overlie portions of said gear, said flange being rigidly secured to said gear.

5. The combination defined by claim 4 wherein said spool end is recessed around its opening to provide a seat for said gear and pinion, and a pair of resilient mounting clips are attached to said spool end to hold said gear and pinion in place.

6. In an electrical measuring instrument of the repulsion type, a winding having an arcuate opening therein and being effective when energized for producing a magnetic field in said opening which varies in accordance with the magnitude of an electrical quantity to be measured, a first magnetic vane fixedly mounted within said opening, a second substantially flat magnetic vane extending in a radial direction and pivotally mounted within said opening, said first and second vanes being substantially parallel when said winding is deenergized and being effective when magnetized to develop repulsion forces therebetween whereby said second vane moves to assume an angular position which varies in accordance with the magnitude of said electrical quantity, said second vane having a predetermined angular position corresponding to a maximum magnitude of said electrical quantity, a third magnetic vane adjustably mounted within said opening and normally positioned with one end proximate to said predetermined position of said second vane and the remainder of said third vane extending in a direction from and located remote from the region transversed by said second vane upon energization of said coil, said third vane being of arcuate shape and offset from said first and second vanes in the direction of the axis of said opening and having its inner edge inclined at an angle with respect to said axis, said edge being inclined such that it extends further into said opening in the region remote from said one end, said second and third vanes being effective when magnetized to develop attraction forces therebetween, said attraction forces having a like effect on said second vane as said repulsion forces whereby the two forces together determine the precise angular position of said second vane, means for readily adjusting the position of said third vane to cause said second vane to assume said predetermined angular position when said winding is energized by said maximum magnitude of said electrical quantity, whereby a substantially linear scale is obtained for any position of said third vane.

7. The combination defined by claim 6 wherein said angle of said third vane is approximately 75 degrees.

References Cited in the file of this patent

UNITED STATES PATENTS 2,183,566    Hoare _____ Dec. 19, 1939

FOREIGN PATENTS 350,380    Great Britain _____ June 1, 1931